United States Patent [19]

Oshiage et al.

[11] Patent Number: 4,785,783

[45] Date of Patent: Nov. 22, 1988

[54] ENGINE CONTROL APPARATUS

[75] Inventors: Katsunori Oshiage, Yokohama; Yasutoshi Nanyoshi, Yokosuka, both of Japan

[73] Assignee: Nissan Motor Company, Limited, Kanagawa, Japan

[21] Appl. No.: 108,987

[22] Filed: Oct. 14, 1987

[30] Foreign Application Priority Data

Oct. 15, 1986 [JP] Japan .................. 61-158794[U]

[51] Int. Cl.⁴ .................. F02P 1/00; F02P 5/04; F02B 31/00
[52] U.S. Cl. .................. 123/417; 123/480
[58] Field of Search .............. 123/417, 436, 492, 493, 123/480

[56] References Cited

U.S. PATENT DOCUMENTS

| 4,508,075 | 4/1985 | Takao et al. ............. 123/417 |
| 4,510,910 | 4/1985 | Niopmuja et al. .......... 123/417 |
| 4,519,038 | 5/1985 | Maljai et al. ............ 123/417 |
| 4,532,902 | 8/1985 | Mieuno et al. ............ 123/417 |
| 4,543,634 | 9/1985 | Kobayoshi et al. ......... 123/417 |
| 4,558,417 | 12/1985 | Akiyama et al. ........... 123/417 |

Primary Examiner—Raymond A. Nelli
Attorney, Agent, or Firm—Lowe, Price, LeBlanc, Becker & Shur

[57] ABSTRACT

An apparatus for controlling the amount of fuel supplied to the engine and the timing of the sparks supplied to the engine. The apparatus reads an engine load sensor at time intervals. A read value of engine load is used in determining the amount of fuel required for one cylinder of the engine. This engine load value is also used in determining the spark timing required for the one cylinder.

6 Claims, 6 Drawing Sheets

ENGINE CONTROL APPARATUS

BACKGROUND OF THE INVENTION

This invention relates to an engine control system and, more particularly, to an engine control unit for controlling the spark timing of an engine.

To achieve fuel economy, reduced unwanted exhaust emissions and improved engine performance and drivability, it is desirable to accurately control the various operations of an internal combustion engine such as spark timing, fuel metering and idle speed. Because of improved accuracy and lower costs, digital engine controllers have been proposed. The engine controllers employ a digital computer which reads an engine load sensor at intervals for use in calculating appropriate values for fuel-injection pulse width and ignition-system spark timing from different programmed relationships. It is the conventional practice to calculate an appropriate value for fuel-injection pulse width as a function of an engine load value read just before the intake phase of engine operation and calculate an appropriate value for ignition-system spark timing as a function of another engine load value read near the end of the compression phase of engine operation. However, the engine load will vary to an great extent, particularly during rapid acceleration, between the time when the engine load sensor is read for calculation of the fuel-injection pulse width and the time when the load sensor is read for calculation of ignition-system spark timing. Under this condition, the resulting spark timing will be different from an optimum timing for the amount of fuel supplied to the cylinder, causing misfire or other undesired engine operation.

SUMMARY OF THE INVENTION

Therefore, it is a main object of the invention to provide an engine control apparatus which can provide an exact spark timing even during transition of engine operation so as to achieve desirable engine performance and drivability over the entire engine operating range.

There is provided, in accordance with the invention, an apparatus for controlling an internal combustion engine including fuel control means for controlling the amount of fuel supplied to the engine and ignition control means for controlling the timing of the sparks supplied to the engine. The apparatus comprises sensor means for generating an electrical signal indicative of the load on the engine, and a control circuit coupled to the sensor means, the fuel control means and the ignition control means. The control circuit includes means for sampling the electrical signal to provide a sampled value of engine load, means for calculating an appropriate value corresponding to a setting of the fuel control means as a function of the sampled engine load value, means for converting the calculated value into a setting of the fuel control means, means for storing the sampled engine load value used in calculating the value corresponding to a setting of the fuel control means, means for reading the stored engine load value, means for calculating an appropriate value corresponding to a setting of the ignition control means as a function of the read engine load value, and means for converting the calculated value into a setting of the ignition control means.

In another aspect of the invention, the control circuit includes means for sampling the electrical signal to provide a sampled value of engine load, means for calculating an appropriate value corresponding to a setting of the fuel control means as a function of the sampled engine load value, means for converting the calculated value into a setting of the fuel control means, for calculating an appropriate value corresponding to a setting of the ignition control means as a function of the sampled engine load value, means for storing the calculated value corresponding to a setting of the ignition control means, means for reading the stored value, and means for converting the read value into a setting of the ignition control means.

BRIEF DESCRIPTION OF THE DRAWINGS

The invention will be described in greater detail by reference to the following description taken in connection with the accompanying drawings, in which:

FIGS. 7 and 6 are flow diagrams illustrating the programming of the digital computer employed in a modified form of the control unit.

DETAILED DESCRIPTION OF THE INVENTION

Figure 1:
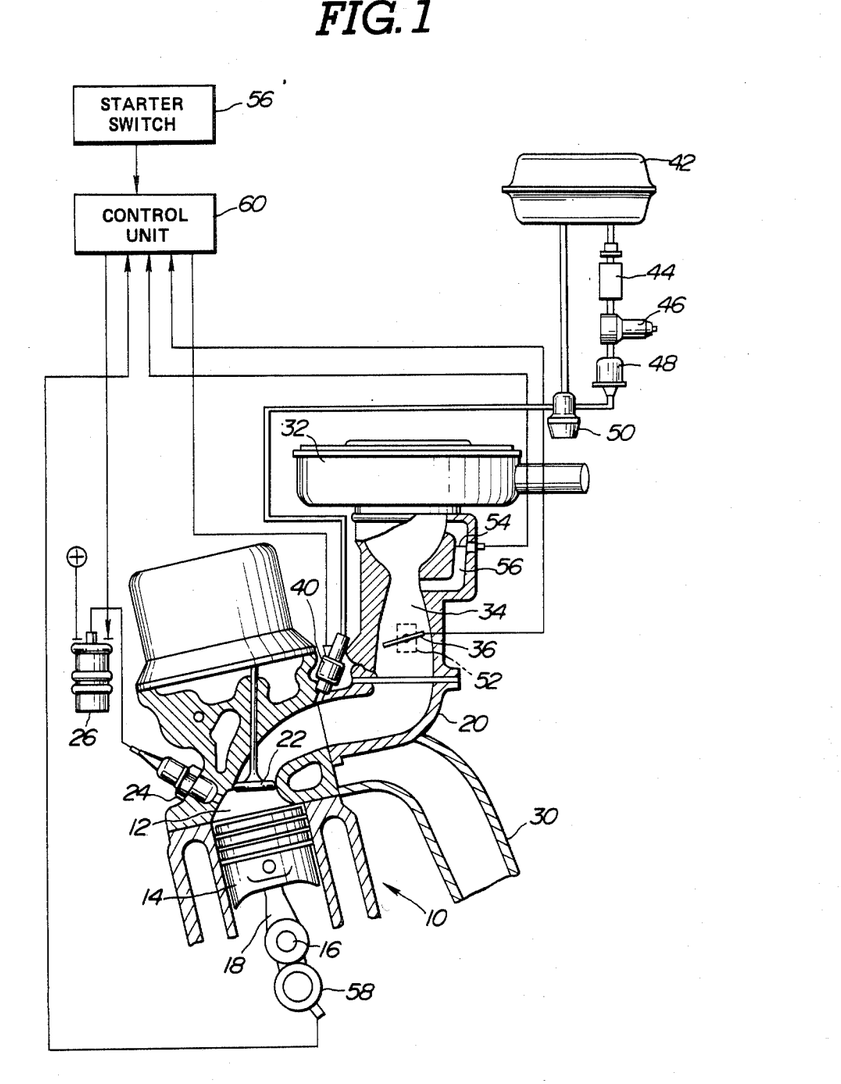
FIG. 1 is a schematic sectional view showing one embodiment of an engine control apparatus made in accordance with the invention.

With reference to the drawings, and in particular to FIG. 1, there is shown a schematic diagram of an engine control system embodying the invention. An internal combustion engine, generally designated by the numeral 10, for an automotive vehicle includes a combustion chamber or cylinder 12. A piston 14 is mounted for reciprocal motion within the cylinder 12. A crankshaft 16 is supported for rotation within the engine 10. Pivotally connected to the piston 14 and the crankshaft 16 is a connecting rod 16 used to produce rotation of the crankshaft 16 in response to reciprocation of the piston 14 within the cylinder 12.

An intake manifold 20 is connected with the cylinder 12 through an intake port with which an intake valve 22 is in cooperation for regulating the entry of combustion ingredients into the cylinder 12 from the intake manifold 20. A spark plug 24 is mounted in the top of the cylinder 12 for igniting the combustion ingredients within the cylinder 12 when the spark plug 24 is energized by the presence of high voltage electrical energy from an ignition coil 26. An exhaust manifold 30 is connected with the cylinder 12 through an exhaust port with which an exhaust valve is in cooperation for regulating the exit of combustion products, exhaust gases, from the cylinder 12 into the exhaust manifold 20. The intake and exhaust valves are driven through a suitable linkage with the crankshaft 16.

Air to the engine 10 is supplied through an air cleaner 32 into an induction passage 34. The amount of air permitted to enter the combustion chamber 12 through the intake manifold 20 is controlled by a butterfly throttle valve 36 situated within the induction passage 34. The throttle valve 36 is connected by a mechanical linkage to an accelerator pedal. The degree of rotation of the throttle valve 36 is manually controlled by the operator of the engine control system.

A fuel injector 40 is connected to a fuel supply system which includes a fuel tank 42, a fuel pump 44, a fuel damper 46, a fuel filter 48, and a pressure regulator 50. The fuel pump 44 is electrically operated and is capable of maintaining sufficient pressure. The fuel damper 46 attenuates the fuel pressure to an extent. The fuel filter 46 prevents any contaminants from reaching the fuel injector 40. The pressure regulator 50 maintains the pressure differential across the fuel injector 40 at a constant level. This regulation is accomplished by a variation in the amount of excess fuel returned by the regulator 50 to the fuel tank 42. The fuel injector 40 opens to inject fuel into the induction passage 34 upstream or downstream of the throttle valve 36 when it is energized by the presence of electrical current. The length of the electrical pulse, that is, the pulse-width, applied to the fuel injector 40 determines the length of time the fuel injector opens and, thus, determines the amount of fuel injected into the intake manifold 20.

In the operation of the engine 10, fuel is injected through the fuel injector 40 into the intake manifold 20 and mixes with the air therein. When the intake valve opens, the air-fuel mixture enters the combustion chamber 12. An upward stroke of the piston 14 compresses the air-fuel mixture, which is then ignited by a spark produced by the spark plug 24 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 30.

Although the engine 10 as illustrated in FIG. 1 has only one combustion chamber 12 formed by a cylinder and piston, it should be understood that the engine control system described here is equally applicable to a multi-cylinder engine. Thus, it should be understood that a four-cylinder engine has four cylinders, four intake valves, four exhaust valves, four reciprocating pistons, four fuel injectors and four spark plugs to ignite the air-fuel mixture within the combustion chambers and that a six-cylinder engine has six cylinders, six intake valves, six exhaust valves, six reciprocating pistons, six fuel injectors and six spark plugs to ignite the air-fuel mixture within the combustion chambers. It should also be understood that the engine control system described here is equally applicable to a multi-cylinder engine having a plurality of fuel injectors arranged to be actuated singly or in groups of varying numbers in a sequential fashion as well as simultaneously. In addition, it should be understood that the engine control system described here is equally applicable to a multi-cylinder engine of the single point injection (SPI) type having a single fuel injector arranged to inject fuel into the induction passage 34.

The amount of fuel metered to the engine, this being determined by the width of the electrical pulses applied to the fuel injector 40, the fuel-injection timing, and the ignition-system spark timing are repetitively determined from calculations performed by a digital computer, these calculations being based upon various conditions of the engine that are sensed during its operation. These sensed conditions include throttle position, intake air flow, and engine speed. Thus, an idle switch 52, a flow meter 54, a starter switch 56, and a crankshaft position sensor 56 are connected to a control unit 60.

The idle switch 52 closes to supply current from the engine battery to the control unit 60 in response to a throttle position at an angle less than a fixed value, for example, 6° open when the engine is idling. The flow meter 54 comprises a thermosensitive wire placed in a bypass passage 34a provided for the induction passage 34 upstream of the throttle valve 36. The starter switch 56 closes to supply current from the engine battery to the control unit 60 when the engine is starting. The crankshaft position sensor 58 produces a series of crankshaft position electrical pulses C1 each corresponding to one degree of rotation of the engine crankshaft and a series of reference electrical pulses Ca at a predetermined number of degrees, for example, 70° before the top dead center position of each engine piston.

Figure 2:
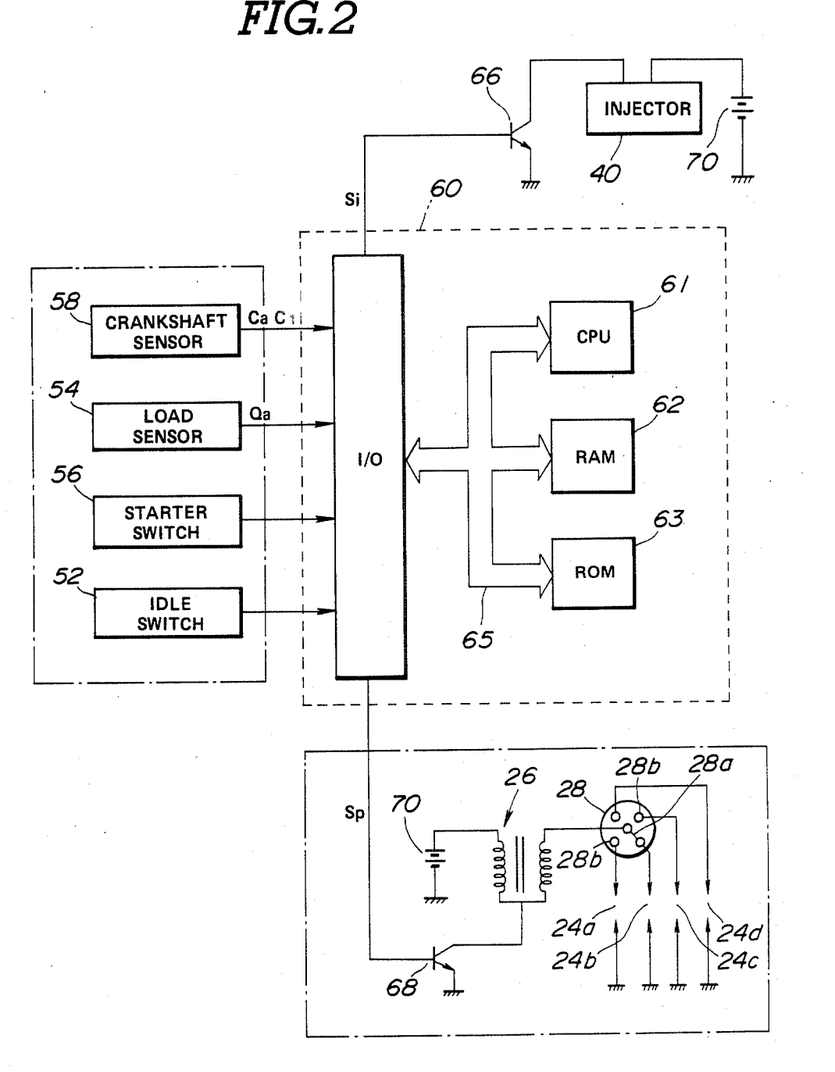
FIG. 2 is a block diagram showing the detailed arrangement of the control unit of FIG. 1.

Referring to FIG. 2, the control unit 60 comprises a digital computer which includes a central processing unit (CPU) 61, a random access memory (RAM) 62, a read only memory (ROM) 63, and an input/output control circuit (I/O) 64. The central processing unit 61 communicates with the rest of the computer via data bus 65. The input/output control circuit 64 includes a counter which counts the reference pulses Ca fed from the crankshaft position sensor 58 and converts it into an engine speed indication digital signal for application to the central processing unit 61. The input/output control circuit 64 also includes an analog-to-digital converter which receives analog signals from the flow meter 54 and other sensors and converts them into digital form for application to the central processing unit 61. The A to D conversion process is initiated on command from the central processing unit 61 which selects the input channel to be converted. The read only memory 63 contains the program for operating the central processing unit and further contains appropriate data in look-up tables used in calculating appropriate values for fuel delivery requirements and ignition-system spark timing. Control words specifying desired fuel delivery requirements and ignition-system spark timing are periodically transferred by the central processing unit 61 to the fuel-injection and spark-timing control circuits included in the input/output control circuit 64. The fuel injection control circuit converts the received control word into a fuel injection pulse signal Si for application to a power transistor 66. The power transistor 66 connects the fuel injector 40 to the engine battery 70 for a time period determined by the width of the fuel injection control pulse signal Si. The spark timing control circuit converts the received control word into a spark timing control pulse signal Sp for application to a power transistor 68. The power transistor 68 connects the ignition coil 26 to the engine battery 70 for a time period determined by the width of the spark timing control pulse signal Sp.

The ignition system includes a distributor 28 connected with the ignition coil 26 to energize the spark plugs 24 of the engine. For this purpose, the ignition coil 26 has a primary winding connected across the engine battery 70 through the power transistor 66. The ignition coil 26 has a high voltage terminal connected to a rotor 28a of the distributor 28. The rotor 28a is driven at one-half the rotational velocity of the crankshaft 16. The distributor 28 has electrical contacts 28b each of which is connected in the usual manner by separate electrical leads to the spark plugs 24 of the engine. As the distributor rotor 28a rotates, it sequentially contacts the electrical contacts 28b to permit high voltage electrical energy to be supplied at appropriate intervals to the spark plugs 24, causing sparks to be generated across the gaps 24a, 24b, 24c and 24d of the respective spark plugs 24. The distributor 28 does not control ignition-system spark timing. Rather, spark timing is an independently controlled variable calculated through the use of the digital computer in a manner hereinafter described. It should be understood that the illustrated for cylinder engine is shown and described only to facilitate a more complete understanding of the engine control system embodying the invention.

Figure 3:
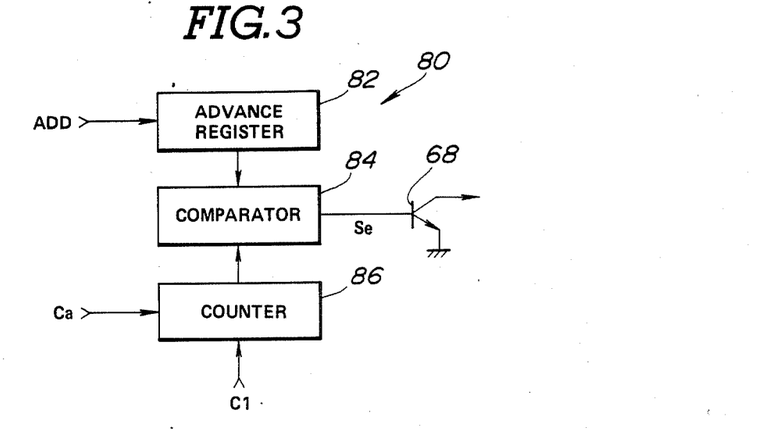
FIG. 3 is a block diagram showing the spark timing control circuit used in the control unit of FIG. 2.

Referring to FIG. 3, the spark timing control circuit, generally designated by the numeral 80, includes an advance register 82, a comparator 84 and a counter 86. The advance register 82 loads the calculated spark timing digital value ADD transferred thereto from the central processing unit 61. The counter 86 counts the crankshaft position pulses C1 fed thereto from the crankshaft position sensor 58. The counter 86 responds to a reference pulse Ca fed thereto from the crankshaft position sensor 58 by clearing its count and starting its counting operation. The comparator 84 compares the count of the counter 86 with the digital value loaded on the advance register 82 and produces a control pulse signal Sc to the power transistor 68. This control pulse signal changes from a low level to a high level turning on the power transistor 68 when the counter 86 is reset. The control pulse signal Sc changes from the high level to the low level turning off the power transistor 68 when the count of the counter 86 reaches the value transferred to the advance register 82 from the central processing unit 61.

Figure 4:
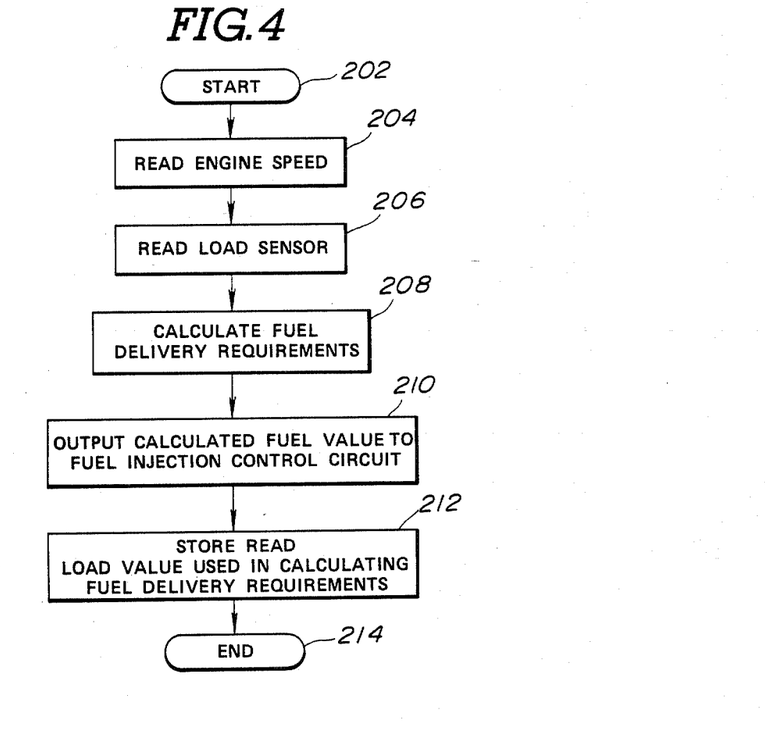
FIGS. 4 and 5 are flow diagrams illustrating the programming of the digital computer employed in the control unit.

FIG. 4 is a flow diagram illustrating the programming of the digital computer as it is used to determine a desired value for fuel delivery requirement.

The computer program is entered at the point 202 each time fuel injection is required. It should be understood that this computer program is entered each time fuel injection is required for each of the fuel injectors when the invention is applied to an engine having a plurality of fuel injectors arranged to inject fuel in a sequential fashion for the respective cylinders.

At the point 204 in the program, the engine speed signal is read. At the point 206, the intake air flow signal Qa fed from the flow meter 54 is converted to digital form and read it. At the point 208, a desired value for fuel delivery requirement, in the form of fuel-injection pulse-width, is calculated from a relationship programmed into the read only memory 63. The relationship defines fuel-injection pulse-width as a function of engine load, as inferred from measurement of intake air flow, and engine speed in a manner well known in the art. At the point 210 in the program, the calculated fuel-injection pulse-width value is outputted to the fuel injection control circuit. The fuel injection control circuit converts the outputted value into a fuel-injection pulse-width which determines the length of time fuel is injected through the fuel injector 40 and thus the amount of fuel supplied to the engine.

At the point 212 in the program, the read engine load value, which was used in calculating a desired value for fuel delivery requirement, is stored in the random access memory 62 at a predetermined location. It should be note that the read engine load value may be stored in the random access memory 62 along with the engine speed value read at the point 204. Following this, the program proceeds to the end point 214.

Figure 5:
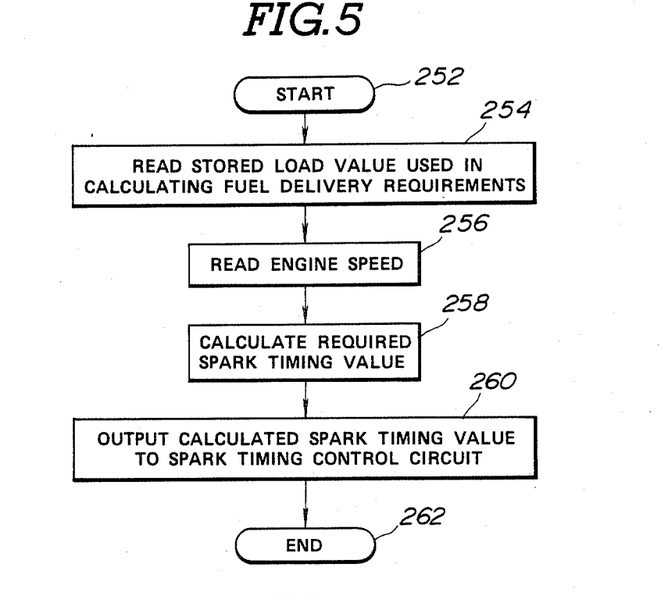
Figure 6:
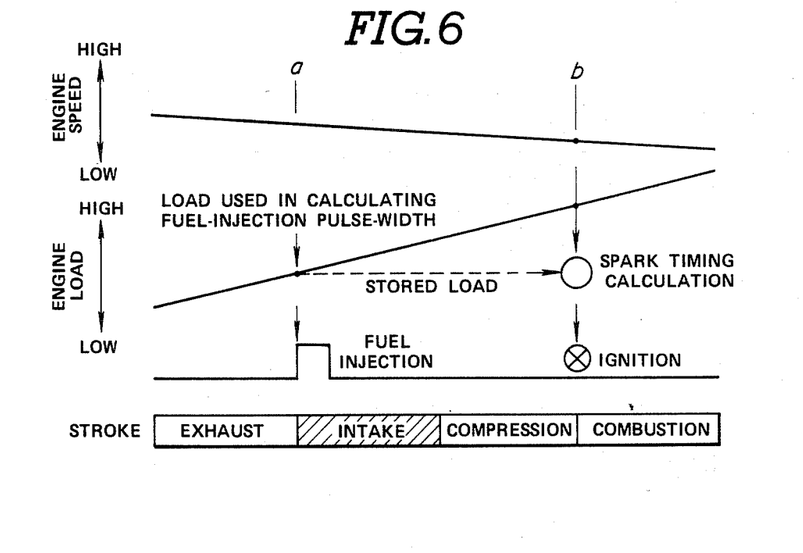
FIG. 6 is a diagram used in explaining the operation of the control unit.

FIG. 5 is a flow diagram illustrating the programming of the digital computer as it is used to determine a desired value for ignition-system spark timing.

The computer program is entered at the point 252 at predetermined time intervals. At the point 254 in the program, the central processing unit 61 reads the engine load value stored at the point 212 of FIG. 4. At the point 256, the most recent engine speed value is read. It should be understood that if the engine speed value read at the point 204 of FIG. 4 is a stored along with the engine load value at the point 212 of FIG. 4, the step at the point 256 may be replaced with a step of reading the engine speed value stored at the point 212 of FIG. 4 in the random access memory 62.

At the point 208 in the program, a desired value for ignition-system spark timing is calculated from a relationship programmed into the read only memory 63. This relationship defines ignition-system spark-timing as a function of engine load, as inferred from measurement of intake air flow, and engine speed in a manner well known in the art. At the point 260, the calculated ignition-system spark timing value is outputted to the advance counter 82 of the spark timing control circuit. Following this, the program proceeds to the end point 262.

The operation of the engine control system of the invention will be described with reference to the diagram of FIG. 4. Assuming now that fuel injection is required at a time a, the control unit 60 reads the most recent engine load value, calculates a desired value for fuel-injection pulse-width using the read most recent engine load value, and immediately actuates the fuel injector to inject fuel for a time corresponding to the calculated fuel-injection pulse-width value. The load value used in calculating the fuel-injection pulse-width value is stored in the random access memory 62. When ignition is required for a cylinder at a time b later than the time a, the control unit 60 calculates a desired value for ignition-system spark-timing using the stored engine load value rather than the most recent engine load value and immediately actuates the corresponding spark plug. It is, therefore, possible to ignite the air-fuel mixture within the combustion chamber at a timing suitable for the amount of fuel supplied to the cylinder.

The operation of the engine control system of the invention applied to an internal combustion engine having a plurality of fuel injectors arranged to inject fuel in a sequential fashion for the respective cylinders will be apparent from the above description. That is, when fuel injection is required for a cylinder at a time a, the control unit 60 reads the most recent engine load value, calculates a desired value for fuel-injection pulse-width using the read most recent engine load value, and immediately actuates the fuel injector to inject fuel into the corresponding intake port for a time corresponding to the calculated fuel-injection pulse-width value. The load value used in calculating the fuel-injection pulse-width value for the cylinder is stored in the random access memory 62. When ignition is required for the cylinder at a time b later than the time a, the control unit 60 calculates a desired value for ignition-system spark-timing using the stored engine load value rather than the most recent engine load value and immediately actuates the corresponding spark plug. It is, therefore, possible to ignite the air-fuel mixture within the combustion chamber at a timing suitable for the amount of fuel supplied to the cylinder.

Figure 7:
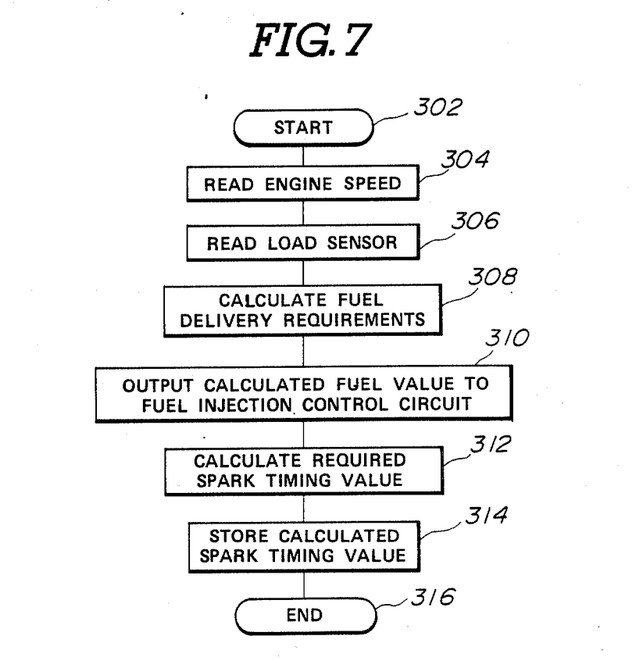

FIG. 7 is a flow diagram illustrating a modified form of the programming of the digital computer as it is used to determine a desired value for fuel delivery requirement.

The computer program is entered at the point 302 each time fuel injection is required. It should be understood that this computer program is entered each time fuel injection is required for each of the fuel injectors when the invention is applied to an engine having a plurality of fuel injectors arranged to inject fuel in a sequential fashion for the respective cylinders.

At the point 304 in the program, the engine speed signal is read. At the point 306, the intake air flow signal Qa fed from the flow meter 54 is converted to digital form and read it. At the point 308, a desired value for fuel delivery requirement, in the form of fuel-injection pulse-width, is calculated from a relationship programmed into the read only memory 63. The relationship defines fuel-injection pulse-width as a function of engine load, as inferred from measurement of intake air flow, and engine speed in a manner well known in the art. At the point 310 in the program, the calculated fuel-injection pulse-width value is outputted to the fuel injection control circuit. The fuel injection control circuit converts the outputted value into a fuel-injection pulse-width which determines the length of time fuel is injected through the fuel injector 40 and thus the amount of fuel supplied to the engine.

At the point 312 in the program, a desired value for ignition-system spark timing is calculated from a relationship programmed into the read only memory 63. This relationship defines ignition-system spark timing as a function of engine load, as inferred from measurement of intake air flow, and engine speed in a manner well known in the art. At the point 314, the calculated ignition-system spark timing value is stored in the random access memory 62 at a predetermined location. Following this, the program proceeds to the end point 316.

Figure 8:
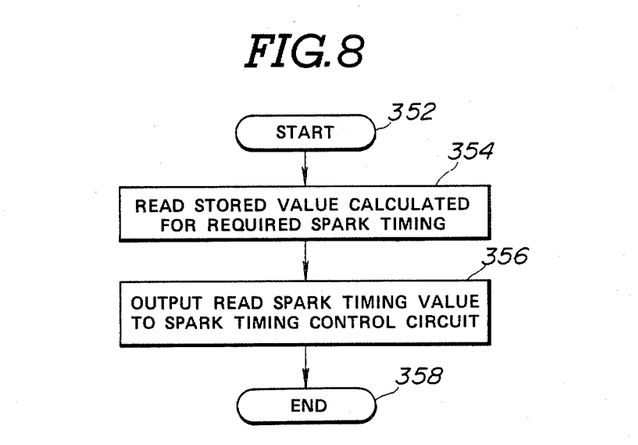

FIG. 8 is a flow diagram illustrating a modified form of the programming of the digital computer as it is used to determine a desired value for ignition-system spark timing.

The computer program is entered at the point 352 at predetermined time intervals. At the point 354 in the program, the central processing unit 61 reads the calculated spark timing value stored at the point 314 of FIG. 7. At the point 356, the read value for ignition-system spark timing is outputted to the advance counter 82 of the spark timing control circuit. Following this, the program proceeds to the end point 358.

Figure 9:
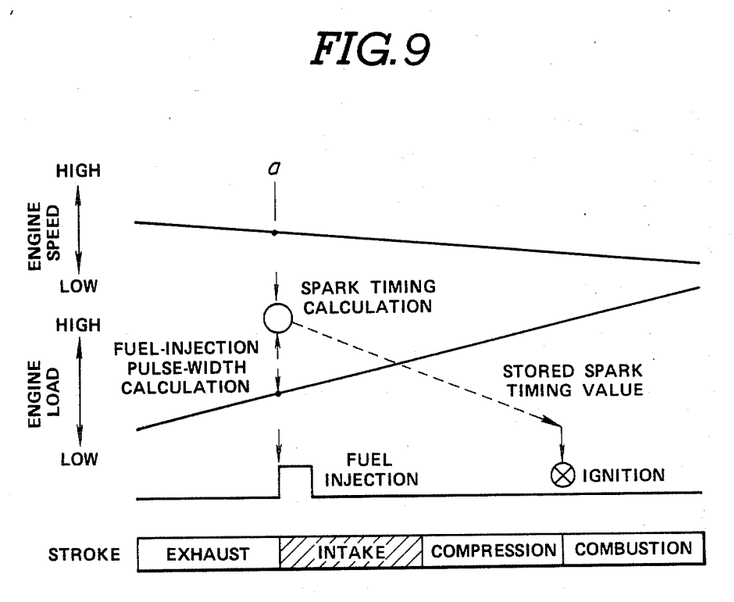
FIG. 9 is a diagram used in explaining the operation of the modified form of the control unit.

The operation of this modification of the invention will be described with reference to the diagram of FIG. 9. Assuming now that fuel injection is required at a time a, the control unit 60 reads the most recent engine load value, calculates a desired value for fuel-injection pulse-width using the read most recent engine load value, and immediately actuates the fuel injector to inject fuel for a time corresponding to the calculated fuel-injection pulse-width value. The control unit 60 also calculates a desired value for ignition-system spark timing using the engine load value used in calculating the fuel-injection pulse-width value and stores the calculated spark timing value in the random access memory 62 at a predetermined location. When ignition is required for a cylinder at a time later than the time a, the control unit 60 outputs the read ignition-system spark ignition value to the ignition timing control circuit, thereby actuating the corresponding spark plug. It is, therefore, possible to ignite the air-fuel mixture within the combustion chamber at a timing suitable for the amount of fuel supplied to the cylinder.

The operation of the engine control system of the invention applied to an internal combustion engine having a plurality of fuel injectors arranged to inject fuel in a sequential fashion for the respective cylinders will be apparent from the above description. That is, when fuel injection is required for a cylinder at a time a, the control unit 60 reads the most recent engine load value, calculates a desired value for fuel-injection pulse-width using the read most recent engine load value, and immediately actuates the fuel injector to inject fuel into the corresponding intake port for a time corresponding to the calculated fuel-injection pulse-width value. The control unit 60 calculates a desired value for ignition-system spark timing using the load value used in calculating the fuel-injection pulse-width value for the cylinder. The calculated spark timing value is stored in the random access memory 62 at a predetermined location. When ignition is required for the cylinder at a time later than the time a, the control unit 60 reads the stored ignition-system spark-timing value and immediately outputs the read spark timing value to the spark timing control circuit, thereby actuating the corresponding spark plug. It is, therefore, possible to ignite the air-fuel mixture within the combustion chamber at a timing suitable for the amount of fuel supplied to the cylinder.

According to the invention, the engine load value used in calculating an appropriate value for fuel-injection pulse-width is used in calculating a corresponding value for ignition-system spark-timing. It is, therefore, possible to provide an exact spark timing even during transition of engine operation. This is effective to achieve desirable engine performance and drivability over the entire engine operating range.

Although the invention has been described in connection with a load sensor which senses the amount of air flow to the engine, it should be understood that the engine load sensor may provides an inference of engine load by sensing the absolute pressure within the intake manifold 20 or the degree of opening of the throttle valve 36. In addition, it should be understood that these parameters may be used solely or in combination to provide an inference of engine load.

What is claimed is:

1. An apparatus for controlling an internal combustion engine including fuel control means for controlling the amount of fuel supplied to the engine and ignition control means for controlling the timing of the sparks supplied to the engine, comprising:
   sensor means for generating an electrical signal indicative of the load on the engine; and
   a control circuit coupled to the sensor means, the fuel control means and the ignition control means, the control circuit including means for sampling the electrical signal to provide a sampled value of engine load, means for calculating an appropriate value corresponding to a setting of the fuel control means as a function of the sampled engine load value, means for converting the calculated value into a setting of the fuel control means, means for storing the sampled engine load value used in calculating the value corresponding to a setting of the fuel control means, means for reading the stored engine load value, means for calculating an appropriate value corresponding to a setting of the ignition control means as a function of the read engine load value, and means for converting the calculated value into a setting of the ignition control means.

2. An apparatus for controlling an internal combustion engine including at least one cylinder provided with a spark plug and a fuel injector, comprising:
sensor means for generating an electrical signal indicative of the load on the engine; and
a control circuit coupled to the sensor means, the spark plug and the fuel injector, the control circuit including means for sampling the electrical signal to provide a sampled value of engine load, means for calculating an appropriate value corresponding to a required amount of fuel supplied through the fuel injector for the cylinder as a function of the sampled engine load value, means for operating the fuel injector to supply fuel in an amount corresponding to the calculated value, means for storing the engine load value used in calculating the value corresponding to the required amount of fuel supplied for the engine cylinder through the fuel injector, means for calculating an appropriate value corresponding to a required timing of the spark supplied to the engine cylinder from the spark plug as a function of the stored engine load value, and means for operating the spark plug to ignite an air-fuel mixture within the cylinder at a time corresponding to the calculated value.

3. The apparatus as claimed in claim 2, wherein the engine includes a plurality of cylinders provided with respective fuel injectors arranged to be actuated in a predetermined sequence to supply fuel for the corresponding cylinders.

4. An apparatus for controlling an internal combustion engine including fuel control means for controlling the amount of fuel supplied to the engine and ignition control means for controlling the timing of the sparks supplied to the engine, comprising:
sensor means for generating an electrical signal indicative of the load on the engine; and
a control circuit coupled to the sensor means, the fuel control means and the ignition control means, the control circuit including means for sampling the electrical signal to provide a sampled value of engine load, means for calculating an appropriate value corresponding to a setting of the fuel control means as a function of the sampled engine load value, means for converting the calculated value into a setting of the fuel control means, means for calculating an appropriate value corresponding to a setting of the ignition control means as a function of the sampled engine load value, means for storing the calculated value corresponding to a setting of the ignition control means, means for reading the stored value, and means for converting the read value into a setting of the ignition control means.

5. An apparatus for controlling an interna combustion engine including at least one cylinde provided with a spark plug and a fuel injector, comprising:
sensor means for generating an electrical signal indicative of the load on the engine; and
a control circuit coupled to the sensor means, the spark plug and the fuel injection, the control circuit including means for sampling the electrical signal to provide a sampled value of engine load, means for calculating an appropriate value corresponding to a required amount of fuel supplied for the engine cylinder through the fuel injector as a function of the sampled engine load value, means for operating the fuel injector to supply fuel in an amount corresponding to the calculated value, means for calculating an appropriate value corresponding to a required timing of the spark supplied to the engine cylinder from the spark plug as a function of the sampled engine load value, means for storing the calculated value corresponding to the required timing of the spark supplied to the engine cylinder, means for reading the stored value, and means for operating the spark plug to ignite an air-fuel mixture within the cylinder at a time corresponding to the read value.

6. The apparatus as claimed in claim 5, wherein the engine includes a pluarality of cylinders provided with respective fuel injectors arranged to be actuated in a predetermined sequence to supply fuel for the corresponding cylinders.

* * * * *